Dec. 6, 1966  O. D. JOHNSON ETAL  3,289,513
ROTARY CUTTING APPARATUS

Filed Sept. 1, 1964  3 Sheets-Sheet 1

LOAD  UNLOAD

INVENTORS
OLIVER D. JOHNSON
DAVID W. LEACH

BY *G. R. Gugger*

AGENT

United States Patent Office 3,289,513
Patented Dec. 6, 1966

3,289,513
ROTARY CUTTING APPARATUS
Oliver D. Johnson, Vestal, and David W. Leach, Endwell, N.Y., assignors to International Business Machines Corporation, New York, N.Y., a corporation of New York
Filed Sept. 1, 1964, Ser. No. 393,518
7 Claims. (Cl. 83—344)

This invention relates to a rotary cutting apparatus and more particularly to a rotary cutting tool unit having a differentially spring loaded tool adjustment.

In the preparation of record cards for use by the market in record controlled accounting machines, a large, mill size roll of paper or cardstock is placed on a rotary card manufacturing machine. The paper web is unwound and passed through several stations in the machine, one of which is a perforating station where the web is perforated transversely at regular intervals to provide individual record cards or sheets. Additional perforating stations may be used to cut either round or diagonal corners on the cards and also to score the cards to provide removable stub sections and the like. Machines of this type can process 1400 or more cards per minute and the production output per machine generally runs in the neighborhood of 600,000 cards per day. With this magnitude of tool usage, the requirement for long tool life and increasingly better quality cutting has made the relationship of the cutting tool to the back-up roll very critical. In improving this relationship, a differential spring arrangement is provided between the cutting tool and back-up roll which provides a mechanically simple and operationally practical method of obtaining a precise tool adjustment, as well as a tool wear compensation capability, and automatic compensation for thermal expansions and component eccentricities.

Accordingly, a principal object of the present invention is to provide an improved rotary cutting apparatus having a differential spring running adjustment for compensating for tool wear.

A further object of the present invention is to provide an improved rotary cutting apparatus having a differential spring automatic compensation for thermal expansion and for component eccentricities.

A still further object of the present invention is to provide a rotary tooling unit using a differential spring method to provide precision tool adjustment in locating the cutting edge of the tool close to but not touching the back-up roll.

A still further object is to provide an improved rotary tooling unit which eliminates the need for a warm up period when working with very accurate dimensions and avoids the hazards of overloading when the unit cools off after being adjusted to operating conditions.

The foregoing and other objects, features and advantages of the invention will be apparent from the following more particular description of preferred embodiments of the invention, as illustrated in the accompanying drawings.

In the description to follow it will be understood that the terms "cutting tool" or "tool" will encompass both tools which remove a shape of material and blades which make a cut or perforation.

Figure 1:
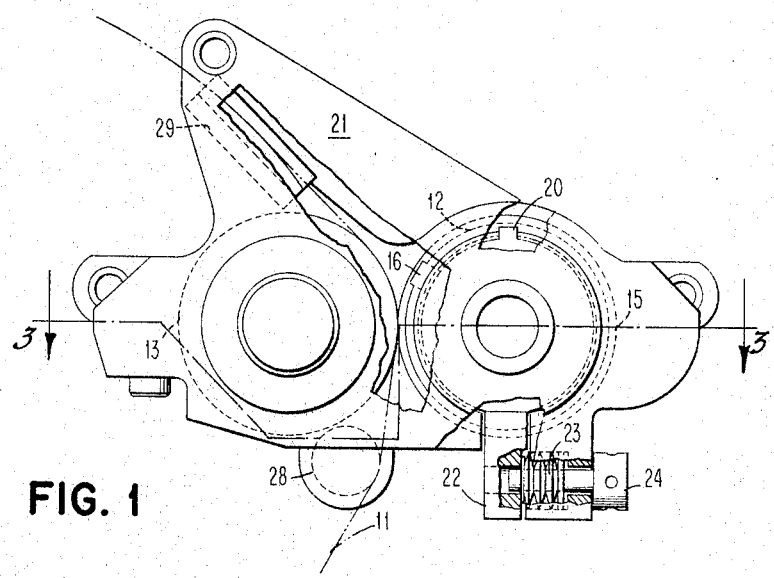
FIG. 1 is a side view of the rotary cutting apparatus of the present invention with the gears removed and with portions of the unit frame cut away.
Figure 2:
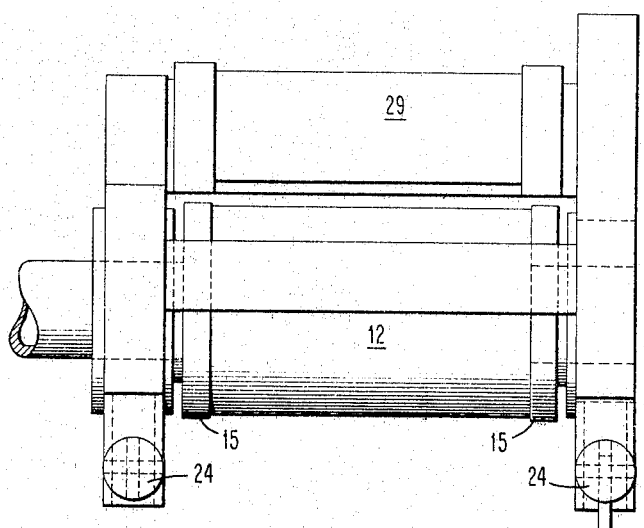
FIG. 2 is an end view of the apparatus of FIG. 1.
Figure 3:
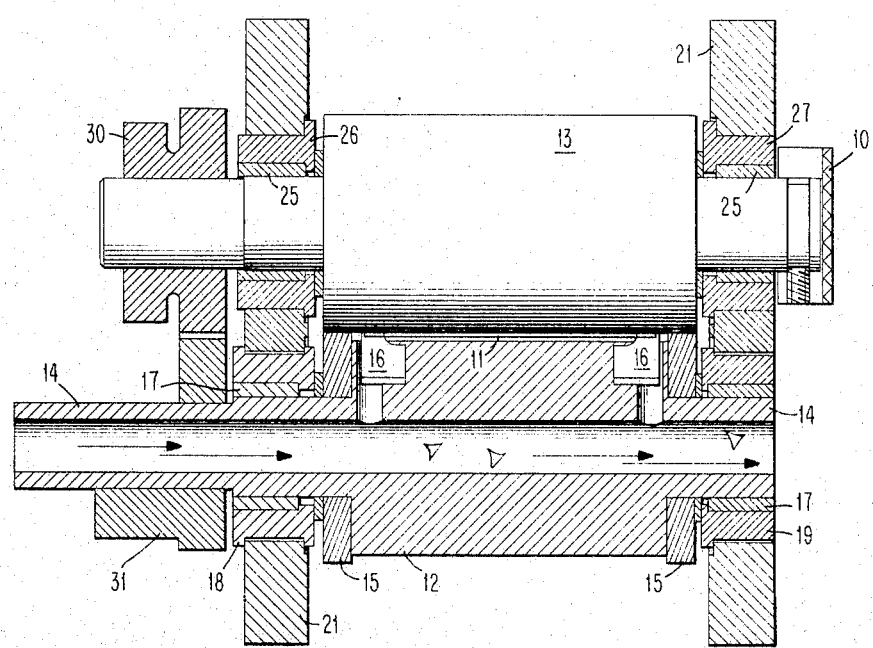
FIG. 3 is a sectional view taken on line 3—3 of FIG. 1.

The assembly of the rotary tooling unit is shown in FIGS. 1 and 3 and the unit is intended to be mounted on a rotary card manufacturing machine which will give it a driving torque through a ratchet 10, FIG. 3, or some other means, and which will feed a web of paper 11, or other material through it between a toolholder roll 12 and a back-up roll 13. As shown in FIG. 3, a toolholder 12 is provided with stub shafts 14 protruding from each end and two bearers 15 are fixed on the stub shafts at each end of the holder. These bearers are made from hard steel and are ground and lapped concentric to their bores with high precision. Mounted in the toolholder roll 12 are one or more cutting tools 16 depending upon the end result desired. Each tool 16 is mounted in the holder 12 in such a manner that it will have a radial measurement .0001 inch less than the radial measurement of the bearers 15. The toolholder is supported on needle bearings 17 by the pivoting housings 18 and 19. Referring to FIG. 1, the pivoting housings 18 and 19 have a key 20 in their top ends which fit into clearance holes in the unit frame 21. On the other end of each housing is a stud 22 which extends through a clearance hole in the bottom of the frame 21. Each stud 22 on each pivoting housing 18, 19 is acted upon by a separate gang spring assembly 23 whose load against the stud 22 is controlled by a separate loading screw 24 which allows a micrometer adjustment of the gang spring assembly 23. In the present design, six Belleville springs are assembled on a small shaft in each gang spring assembly. The spring assemblies act on the studs 22 which in turn pivot the housings 18 and 19 at a mechanical advantage of 2.5 to 1. It is possible to work out a design using compression springs either at a mechanical advantage or directly over the housings 18, 19 and the end result will be the same.

Also located in the unit frame 21 is a back-up roll 13 which is supported by needle bearings 25 located in the bearing housings 26 and 27. These housings, however, are a tight clamp fit with the frame 21 and therefore the back-up roll 13 is held rigidly in the frame 21.

Figure 5:
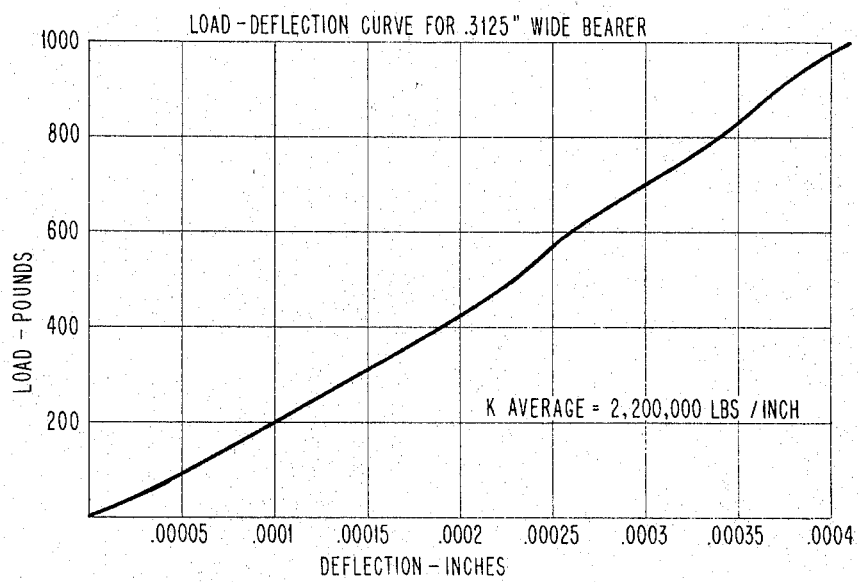
FIG. 5 is a graph showing the load-deflection curve for the apparatus of FIG. 1.
Figure 6:
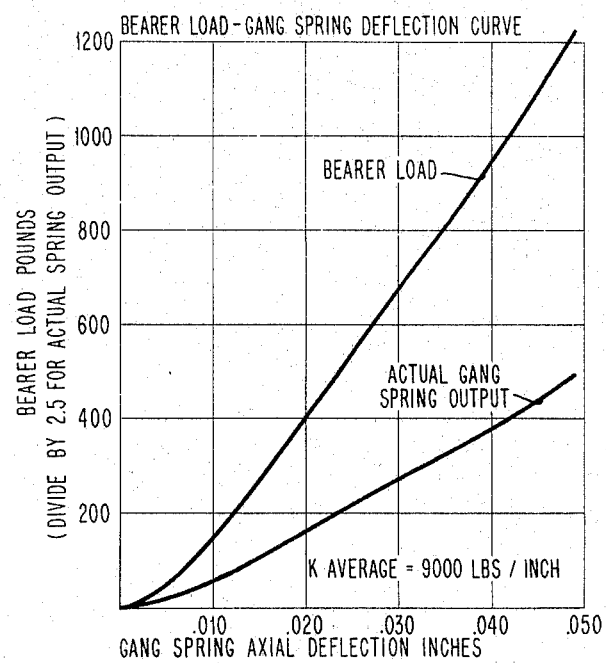
FIG. 6 is a graph showing the bearer load-gang spring deflection curve for the apparatus of FIG. 1.

The bearers 15 can be considered as a spring having a very high spring constant ($k=2,200,000$ lbs./inch) and which is controlled by the gang spring assemblies 23 having a relatively low spring constant ($k=9000$ lbs./inch). The end result is a differential spring arrangement in which a high energy spring is controlled by a lower energy spring. Therefore, relatively large, easily controlled deflections are imposed on the control spring 23 to effect a minute deflection on the working spring. The load-deflection curves for the bearers 15 and for the gang spring assemblies 23 are shown in FIGS. 5 and 6, respectively.

Figure 4:
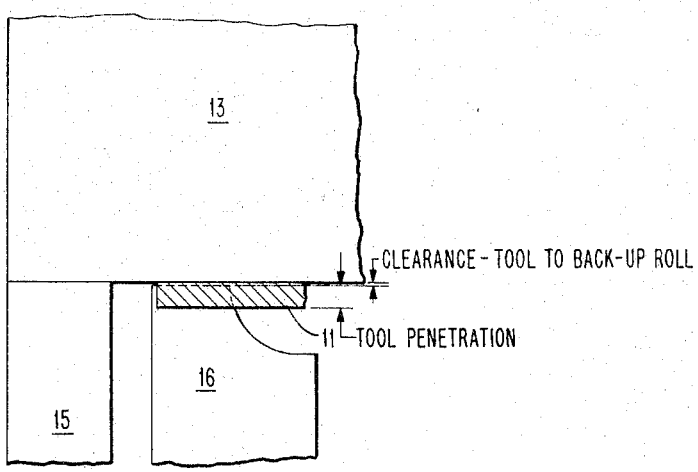
FIG. 4 is an enlarged detail view of a portion of FIG. 3 showing the relationship between the cutting tool and the back-up roll.

In setting up the unit for a punching or scoring operation, the cutting tools 16 would be inserted in the toolholder roll 12 and adjusted to a starting position of .0001 inch below bearer height. The loading screws 24, which give a micrometer adjustment of the preload or deflection on the bearers, would be adjusted until all of the play is taken out of the system and the bearers 15 would be in contact with the back-up roll 13 under some small preload. Under this condition, the tool 16 would clear the back-up roll 13 by approximately .0001 inch, as illustrated in FIG. 4. After accomplishing this adjustment, the unit assembly would then be attached to the main rotary card manufacturing machine. A preferred form of card manufacturing machine on which the present cutting apparatus is used is shown and described in U.S. Patent 2,181,935 which issued on December 5, 1939.

In operation, the web 11 would be fed across a first web guide 28, FIG. 1, through the unit between the holder roll 12 and back-up roll 13, and out through a second web guide 29. Referring to FIG. 3, as the rolls rotate through the action of the input drive ratchet 10, a drive gear 30 on the back-up roll shaft and a driven gear 31 on the toolholder shaft, the web 11 is guided so as to run tight against the back-up roll 13. As the holder roll 12 rotates and tool 16 comes around, it will penetrate into the web, as shown in FIG. 4, as the web is supported by the back-up roll. In the case of a punch, the chip which is removed from the web is drawn down through the tool by the action of air going through the hollow holder roll shaft to a vacuum chamber. In the case of a score, there would simply be a cut or crease in the web and no chip would be removed. It may be necessary when first starting to cut with the unit to re-adjust the bearer load from the first initial small preload. This would be indicated immediately on running the unit by the failure of the tool to cut clean. The situation would be corrected by increasing the preload on the gang spring assemblies 23 using the micrometer adjustment of the loading screws 24. This small increase in bearer preload, for example approximately 50 lbs., would offset the cutting load and maintain the .0001 inch clearance. While the clearance to the back-up roll 13 may be adjusted to a value less than .0001 inch, it is known that actual contact or interference with the back-up roll will severely cut down tool life. Experience has shown that a clean cut can be obtained by bringing the cutting tool close to but not touching the back-up roll.

Under normal conditions the unit would run with clean cutting until a value of several cycles is reached. Predictably then, depending on the cutting edge material chosen, the cutting edge would have worn down radially in the order of .0001 inch to the point where the edge quality of the cut would be unacceptable. The wearing away of the cutting tool material would increase the clearance of the cutting tool such that the web penetration would be cut down. At this point the bearer load would be increased approximately 200 lbs. using the micrometer adjustment of the loading screws 24. This would effect a bearer deflection increase of approximately .0001 inch, as indicated in FIG. 5, and would adjust or decrease the clearance of the cutting tool to the back-up roll. With this adjustment made, the clearance between the back-up roll and the tool is restored back to the original clearance dimension of .0001 inch and the tool will cut clean again.

Three important advantages of the present system should be noted: First, the load adjustment, as described above, can be performed while the machine is running. In other words, it is not necessary to remove the unit from the main machine to make an adjustment to the bearer load. Secondly, the clearance between the back-up roll and the cutting tool can be predetermined and accurately set by knowing the load-deflection data of the springs used and the axial movement of the loading screw per angle of turn, as indicated in FIG. 6. Finally, each bearer may be individually adjusted for differences in tool wear. This would normally be useful in cases where two tools or sets of tools are used, one on either end of the holder. In the present embodiment, two tools 16 are used, one at each end of the holder and adjacent to the bearers 15, such that the pair of tools can be adjusted individually if the wear is uneven.

Further, the differential spring loading of the unit gives automatic compensation for thermal expansion of the unit. As an example, assume that during a long period of operation the unit has heated up to a point such that the center distance in the unit frame 21, FIG. 3, has expanded .002 inch. Since one roll is air cooled, in a non-spring loaded system where both rolls are fixed, the bearers 15 would come out of contact with the back-up roll. The tools 16 then would lose their initially precise adjustment and could not be expected to cut clean. However, since in the present differential spring system the toolholder roll 12 is supported by the pivoting housings 18 and 19, under a spring load, the housings will automatically pivot toward the back-up roll as the center distance increased. In this case, the deflection of the gang spring assembly 23 would be relaxed by approximately .005 inch (.002 inch×2.5—the pivot ratio). Relaxing the gang spring assembly by .005 inch would effect a load change on the bearer 15 of approximately 50 lbs., as indicated in FIG. 6, but a load change on the bearer of 50 lbs. will only change the bearer deflection by .000025 inch due to the very high spring rate, as indicated in FIG. 5. In the case where the unit runs with "hot spots," i.e., if the outside portion of the frame runs warmer than the inside, the differential spring arrangement again automatically compensates for this side to side difference. If for instance, the unit ran so that the inside frame center distance did not change and the outside frame center distance increased by .002 inch, the end result would be a negligible difference in bearer deflection (.000025 inch) across the tool holder. In the manner described above then, the differential spring arrangement automatically compensates for thermal expansion and differences in thermal expansion across the unit.

The differential spring loading also effects automatic compensation for eccentricities in components such as the shafts, needle bearings, bearers, and the back-up roll. In most cases, the error of eccentricities would be a combined error in the assembly of the parts mentioned above and would approximate a value of .001 inch or less. Again, with the differential loading the eccentric rotating error would cause the housings 18 and 19 to pivot back and forth. As the housing pivots back and forth, the gang spring assembly would be compressed and relaxed by an amount of .0025 inch (.001 inch×2.5—the pivot ratio) in a pulsating manner. This would put a pulsating load of approximately 20 lbs. on the bearers 15, as indicated in FIG. 6. Again the bearer deflection would be a negligible .000015 inch, as indicated in FIG. 5. In this manner, the differential spring loading system can automatically compensate for component eccentricities.

Figure 7:
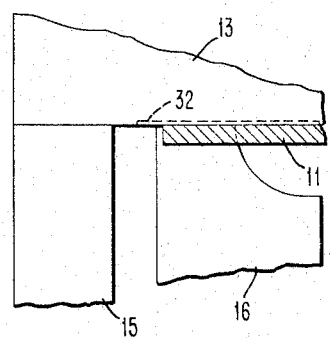
FIG. 7 is an enlarged detail view showing an alternate relationship between the cutting tool and the back-up roll.

As an alternate approach to the present system, the back-up roll may be relieved, as indicated at 32 on FIG. 7, rather than leaving the cutting tool less than the radial measurement of the bearer. To accomplish this, the cutting edges and bearers would be lapped to the same height and then a relief in the order of .0001 inch in depth ground in the back-up roll. The remainder of the differential spring loading system would be the same as described above.

While the invention has been particularly shown and described with reference to preferred embodiments thereof, it will be understood by those skilled in the art that the foregoing and other changes in form and details may be made therein without departing from the spirit and scope of the invention:

What is claimed is:

1. A rotary cutting apparatus of the class described comprising:

a rigidly supported rotatable back-up roll;
a pivotally supported rotatable toolholder roll;
a cutting tool fastened on the periphery of said toolholder roll;
a pair of bearer members on said toolholder roll for coaction against the periphery of said back-up roll;
a pair of gang spring assemblies associated with said toolholder roll for biasing said bearers against said back-up roll; and
means for adjusting said spring assemblies, said spring assemblies and bearers constituting a differential spring for locating the cutting edge of said tool with respect to said back-up roll.

2. A rotary cutting apparatus of the class described comprising:

a rigidly supported rotatable back-up roll;
a pivotally supported rotatable toolholder roll;
a cutting tool fastened on the periphery of said toolholder roll;
a pair of bearer members on said toolholder roll for coaction against the periphery of said back-up roll;
a pair of gang spring assemblies associated with said toolholder roll for biasing said bearers against said back-up roll; and
means for adjusting said spring assemblies, said bearer members having a high spring constant and said spring assemblies having a relatively low spring constant whereby a differential spring arrangement is formed for locating the cutting edge of said tool with respect to said back-up roll.

3. A rotary cutting apparatus of the class described comprising:

a rigidly supported rotatable back-up roll;
a pivotally supported rotatable toolholder roll;
a cutting tool fastened on the periphery of said toolholder roll;
a relatively hard bearer member on said toolholder roll for coaction against the periphery of said back-up roll;
a gang spring assembly associated with said toolholder roll for biasing said bearer against said back-up roll; and
means for adjusting said gang spring assembly to locate the cutting edge of said tool with respect to said back-up roll, said bearer and gang spring assembly forming a high energy spring and a low energy spring, respectively, which automatically vary the location of the cutting edge of said tool to compensate for thermal expansion and component eccentricities of said apparatus.

4. A rotary cutting apparatus of the class described comprising:

a unit frame;
a first pair of housings rigidly supported in said frame;
a back-up roll rotatably supported in said housings;
a second pair of housings pivotally supported in said frame;
a toolholder roll rotatably supported in said second pair of housings;
a cutting tool fastened on the periphery of said toolholder roll;
a hard bearer member on said toolholder roll for coaction against the periphery of said back-up roll;
spring means mounted on said unit frame and acting on said pivotal housings to bias said bearer member against said back-up roll, said bearer member having a radial measurement greater than the radial measurement of said tool whereby the cutting edge of said tool is close to but does not touch said back-up roll; and
means for adjusting said spring means, said bearer member having a high spring constant and said spring means having a relatively low spring constant whereby a differential spring arrangement is formed for locating the cutting edge of said tool with respect to said back-up roll.

5. A rotary cutting apparatus of the class described comprising:

a unit frame;
a first pair of housings rigidly supported in said frame;
a back-up roll rotatably supported in said housings;
a second pair of housings pivotally supported in said frame;
a toolholder roll rotatably supported in said second pair of housings;
a cutting tool fastened on the periphery of said toolholder roll;
a hard bearer member on said toolholder roll for coaction against the periphery of said back-up roll;
gang spring means mounted on said unit frame and acting on said pivotal housings to bias said bearer member against said back-up roll, said bearer member having a radial measurement greater than the radial measurement of said tool whereby the cutting edge of said tool is close to but does not touch said back-up roll; and
said spring loaded pivotally supported toolholder and bearer member having a high spring constant and said gang spring means having a relatively low spring constant to form a differential spring arrangement which is controlled by said pivotal housings to automatically compensate for thermal expansion and component eccentricities in said apparatus.

6. A rotary cutting apparatus of the class described comprising:

a unit frame;
a first pair of housings rigidly supported in said frame;
a back-up roll rotatably supported in said housings;
a second pair of housings pivotally supported in said frame;
a toolholder roll rotatably supported in said second pair of housings;
a cutting tool fastened on the periphery of said toolholder roll;
a hard bearer member on said toolholder roll for coaction against the periphery of said toolholder roll;
gang spring means mounted on said unit frame and acting on said pivotal housings to bias said bearer member against said back-up roll, said bearer member having a radial measurement greater than the radial measurement of said tool whereby the cutting edge of said tool is close to but does not touch said back-up roll; and
axially movable loading screw means for adjusting said gang spring means, said bearer member having a high spring constant and said gang spring means having a relatively low spring constant whereby a differential spring arrangement is formed which may be loaded by said screw means to set a predetermined clearance between said back-up roll and cutting tool.

7. A rotary cutting apparatus of the class described comprising:

a rigidly supported rotatable back-up roll;
a pivotally supported rotatable toolholder roll;
a cutting tool fastened on the periphery of said toolholder roll;
a bearer member on said toolholder roll for coaction against the periphery of said back-up roll, the radial measurement of said tool being the same as the radial measurement of said bearer and said back-up roll being provided with a relieved area for coaction with the cutting edge of said tool;
spring means associated with said toolholder roll for biasing said bearer against said back-up roll; and
means for adjusting said spring means, said spring means and bearer constituting a differential spring for locating the cutting edge of said tool with respect to said back-up roll.

References Cited by the Examiner
UNITED STATES PATENTS 2,299,650 10/1942 Parks et al. _____ 83—344 X
2,390,426 12/1945 Davidson _____ 83—348

WILLIAM S. LAWSON, *Primary Examiner.*